(12) United States Patent
Dartnall et al.

(10) Patent No.: US 6,450,414 B1
(45) Date of Patent: Sep. 17, 2002

(54) HEAT TRANSFER SYSTEM

(75) Inventors: Jonathan Kim Dartnall, Willetton (AU); Alwyn Healy, Bayswater (AU)

(73) Assignee: Jonathan K. Dartnall, Willetton (AU)

( * ) Notice: Subject to any disclaimer, the term of this patent is extended or adjusted under 35 U.S.C. 154(b) by 0 days.

(21) Appl. No.: 09/787,506

(22) PCT Filed: Sep. 17, 1999

(86) PCT No.: PCT/AU99/00787

§ 371 (c)(1),
(2), (4) Date: Jun. 13, 2001

(87) PCT Pub. No.: WO00/17583

PCT Pub. Date: Mar. 30, 2000

(30) Foreign Application Priority Data

Sep. 17, 1998 (AU) ............................................. PP6002

(51) Int. Cl.[7] ............................................. G05D 23/00
(52) U.S. Cl. .......................... 237/2 A; 236/49.3; 165/47
(58) Field of Search ................................ 237/2 A, 1 R; 236/49.3; 165/47, 48.2, 48.1

(56) References Cited

U.S. PATENT DOCUMENTS

| | | | | | |
|---|---|---|---|---|---|
| 3,807,290 A | * | 4/1974 | Eubank | ...................... | 454/257 |
| 3,855,814 A | * | 12/1974 | Eubank | ...................... | 62/244 |
| 4,254,822 A | * | 3/1981 | Geier | ...................... | 165/48 |
| 4,378,787 A | * | 4/1983 | Fleischmann | ............... | 126/430 |
| 4,502,467 A | * | 3/1985 | Smith | ...................... | 126/429 |
| RE32,607 E | | 2/1988 | Smith | | |
| 4,949,902 A | * | 8/1990 | Mills | ........................ | 236/49.3 |
| 5,752,654 A | * | 5/1998 | Mowery, Sr. et al. | ....... | 237/2 B |

FOREIGN PATENT DOCUMENTS

| | | |
|---|---|---|
| AU | A-33942/93 | 9/1993 |
| EP | 0 705 983 A2 | 4/1996 |
| GB | 1 539 893 | 2/1979 |
| GB | 2 114 283 A | 8/1983 |

* cited by examiner

*Primary Examiner*—Harold Joyce
*Assistant Examiner*—Derek S. Boles
(74) *Attorney, Agent, or Firm*—Larson & Taylor PLC

(57) ABSTRACT

A heat transfer system is described for controlling the transfer of heat from a roof space into a living space of a building. The heat transfer unit (10) includes a flexible duct (14) and a ceiling vent (16) for transferring warm air from within the roof space (12) into a living space (18) below. An electric fan (20) located at the top end of the flexible duct (14) is arranged to draw warm air from the roof space (12) down through the duct (14) into the living space (18). A first temperature sensor (22) mounted adjacent the top end of the flexible duct (14) senses the temperature of the air within the roof space (12). A second temperature sensor (24) located in the room below senses the temperature of the air within the living space (18). An electronic controller (26) controls the operation of the electric fan (22) in response to temperature sensing signals from the first and second temperature sensors (22, 24) respectively. In particular, the controller (26) ensures that the electric fan (22) is only activated when the air temperature within the roof space exceeds the air temperature within the living space by a predetermined temperature difference. The unit (10) can also be employed in a cooling mode.

14 Claims, 10 Drawing Sheets

HEAT TRANSFER SYSTEM

FIELD OF THE INVENTION

The present invention relates to a heat transfer apparatus and a method for controlling the transfer of heat from a roof space into a living space of a building and relates particularly, though not exclusively, to a heat transfer system that can also be employed to cool the living space.

BACKGROUND TO THE INVENTION

It is generally known that the temperature of air trapped in a roof space, that is, the air held in the void between the roof cladding material and the ceiling of a building, is considerably higher than the ambient air temperature. The trapped air in the roof space becomes heated due to thermal energy from sunlight which is conducted through the roof tiles or other roof cladding material and re-radiated into the roof space. Some heating may also occur due to heat conducted through the ceiling from the living space below. The degree of heating of the air in the roof space to elevated temperatures is determined by a number of factors, including the amount (intensity and duration) of sunlight that the roof is exposed to, the ambient (outside) air temperature and the extent of roof insulation.

Several prior art systems attempt to exploit the heat accumulated in the roof space for heating a living space below. For example, AU-B-32409/84 discloses a Ventilator which can be used for recycling heated air from a roof cavity of a building or like structure back into a living/work area of the structure. The ventilator assembly of AU-B-32409/84 may be sited in either the roof or ceiling of the structure, and has an axial flow fan for generating a flow of heated air through the assembly. A temperature sensing means 8, for example, a thermostat, may be provided to switch the fan on or off as required. The temperature sensing means 8 may be located within the ventilator assembly or positioned remote from the assembly with interconnecting wiring. AU-A33942/93 discloses a ventilation system designed specifically for ventilating warm air from a roof space for heating a living space below. The system of AU-A33942/93 includes a vent 12 mounted in the ceiling 14 of a house and opening into the living space below, and a ducting means 18 in the form of a concertina ducting tube located in the roof space to provide communication of air from a high point within the roof space to the vent 12. An electric fan 20 forces air to flow through the ducting tube 18 and vent 12 so that warm air can be ducted from the roof space into the living space. The system of AU-A-33942/93 may include a thermostatically controlled switching circuit adapted to switch automatically between summer and winter modes in response to changes in the ambient (exterior) air temperature. The electric fan is solar powered.

One of the disadvantages of these prior art systems is that they do not provide any adequate means for controlling the transfer of air from the roof space at a sufficiently elevated temperature to ensure heating of the living space below. The present invention was developed with a view to providing a heat transfer system that can ensure air is only transferred from the roof space when the temperature of the air in the roof space exceeds the temperature of the air in the living space by a predetermined amount.

SUMMARY OF THE INVENTION

Throughout this specification the term "comprising" is used inclusively, in the sense that there may be other features and/or steps included in the invention not expressly defined or comprehended in the features or steps subsequently defined or described. What such other features and/or steps may include will be apparent from the specification read as a whole.

According to one aspect of the present invention there is provided a heat transfer apparatus for heating a living space in a building, the apparatus comprising:

air transfer means arranged within a roof space of the building for transferring warm air from within the roof space into a living space below;

an electric fan arranged to force air through said air transfer means into the living space;

a first temperature sensor within the roof space for sensing a first air temperature within the roof space;

a second temperature sensor within the living space for sensing a second air temperature within the living space; and an electronic controller operatively connected to said electric fan and said first and second temperature sensors, and wherein said controller ensures that the electric fan is only activated when the first air temperature exceeds the second air temperature by a first predetermined temperature difference and when the first air temperature exceeds a predetermined threshold temperature whereby, in use, warm air transferred from the roof space is able to heat the living space.

More preferably the electric fan is only activated when the second air temperature is below said preset room temperature by a second predetermined temperature difference. Advantageously said preset room temperature is adjustable by an occupant of the living space.

Preferably said controller also ensures that the electric fan is only activated when the first air temperature exceeds a predetermined threshold temperature. More preferably the electric fan is only activated when the first air temperature exceeds the predetermined threshold temperature by a third predetermined temperature difference. Typically said predetermined threshold temperature is set at between 20° C. and 25° C. More typically the predetermined threshold temperature is set at approximately 22.75° C.

According to another aspect of the present invention there is provided a method for controlling the transfer of heat from a roof space into a living space of a building using an electric fan to force warm air from the roof space of the building into the living space below, the method comprising:

sensing a first air temperature within the roof space;

sensing a second air temperature within the living space; and activating said electric fan only when the first air temperature exceeds the second air temperature by a first predetermined temperature difference and when the first air temperature exceeds a predetermined threshold temperature whereby, in use, warm air transferred from the roof space is able to heat the living space.

BRIEF DESCRIPTION OF THE DRAWINGS

In order to facilitate a more comprehensive understanding of the nature of the invention several embodiments of the heat transfer system will now be described in detail, by way of example only, with reference to the accompanying drawings, in which.

DETAILED DESCRIPTION OF THE PREFERRED EMBODIMENTS

Figure 1:
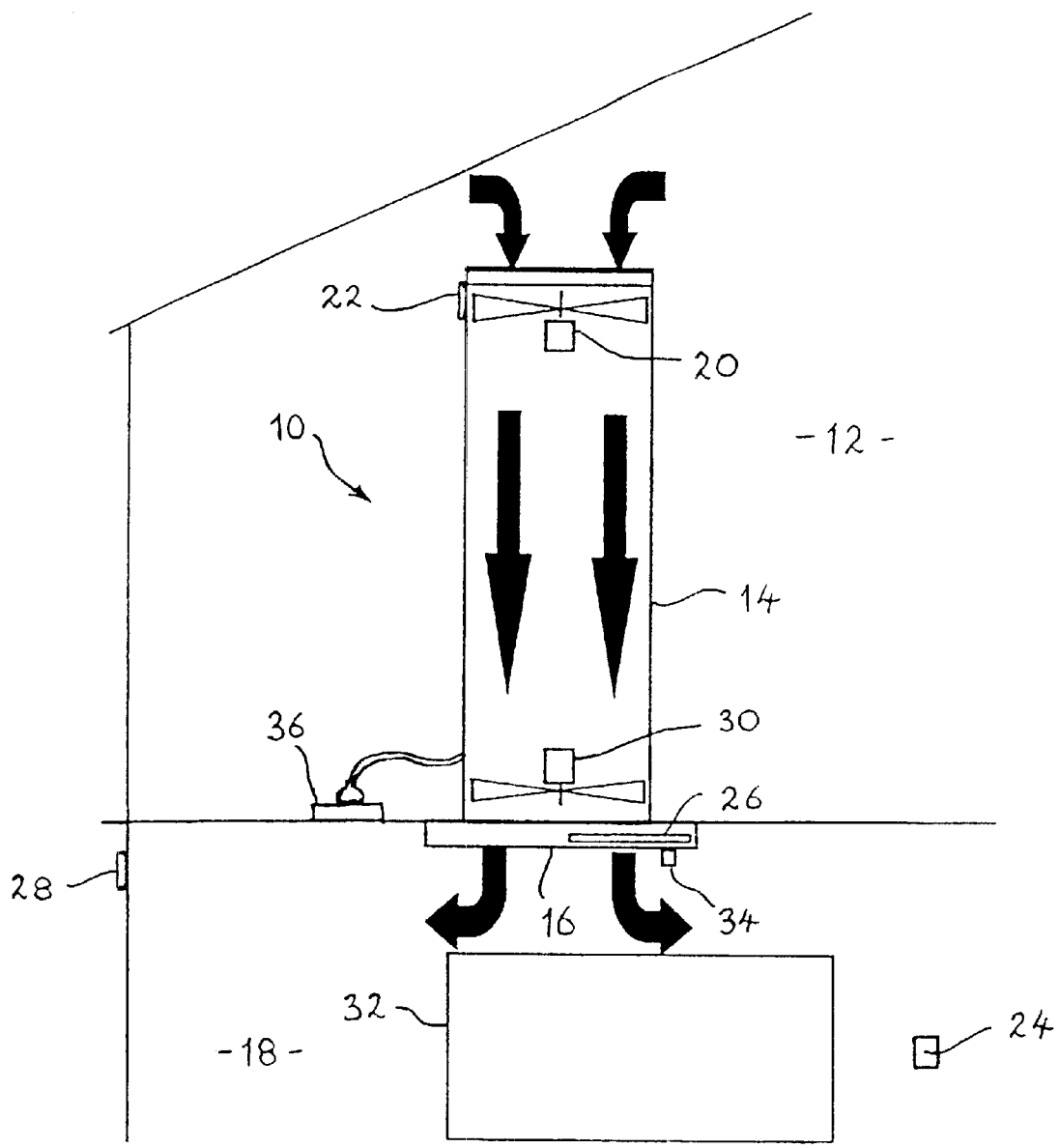
FIG. 1 is a schematic diagram of a first embodiment of the heat transfer system according to the invention in the form of a Do It Yourself (DIY) unit shown operating in a heating mode.
Figure 2:
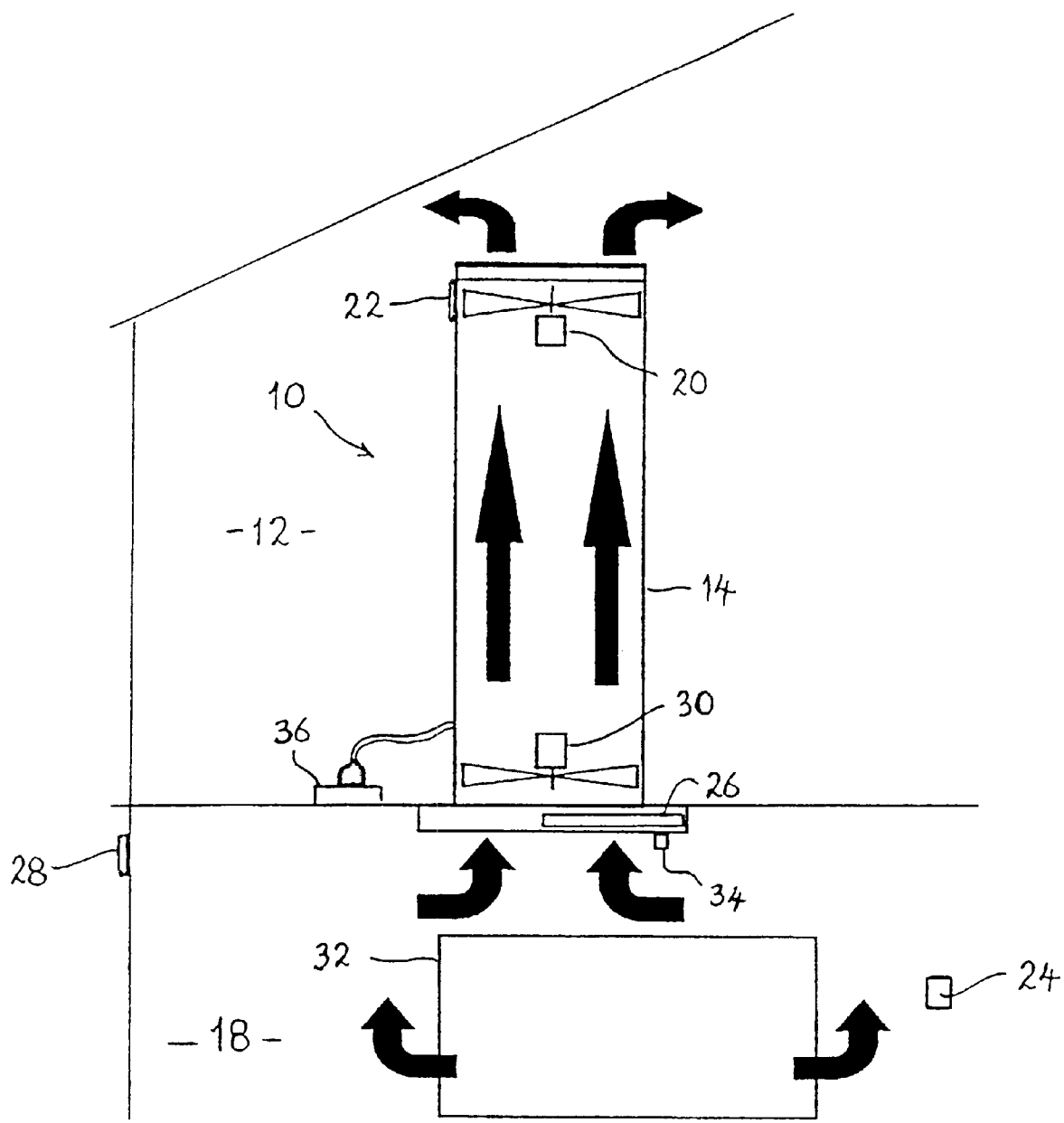
FIG. 2 is a schematic diagram of the DIY unit of FIG. 1 shown operating in a cooling mode.

A first embodiment of the heat transfer system according to the present invention as shown in FIGS. 1 and 2 is in the form of a Do It Yourself (DIY) unit 10 which can be installed in a roof space 12 of a building, such as a residential house, by the home handyman. The unit 10 comprises a flexible duct 14 and a ceiling vent 16 for transferring warm air from within the roof space 12 into a living space 18 below. An electric fan 20 located at the top end of the flexible duct 14 is arranged to draw warm air from the roof space 12 down through the duct 14 and vent 16 into the living space 18. An axial fan 20 is illustrated, however any suitable electric fan may be employed. The heat transfer unit 10 further comprises a first temperature sensor 22 typically mounted on the side of the flexible duct 14 adjacent the top end thereof, for sensing the temperature of the air (T3) within the roof space 12. A second temperature sensor 24, which is typically located on a wall in the room below, senses the temperature of the air (T1) within the living space 18. Ceiling vent 16 or duct 14 may optionally include an air filter to filter out any dust or other air-borne particles.

The heat transfer unit 10 further comprises an electronic controller 26, which in this embodiment is located within a housing of the ceiling vent 16 for convenience. Controller 26 controls the operation of the electric fan 22 in response to temperature sensing signals from the first and second temperature sensors 22, 24 respectively. In this connection, the controller 26 includes an analogue to digital converter (ADC) for converting the analogue sensing signals from the sensors 22, 24 into a digital format for processing by the processor unit of the controller 26. Typically electronic controller 26 is a microprocessor-based controller, although any suitable electronic controller may be employed, such as a programmable logic controller (PLC), which is capable of controlling operation of the heat transfer apparatus according to the following control strategy.

Through trial and experimentation, the inventor has found that unless there is a significant temperature difference between the air temperature within the roof space and the air temperature in the living space, air transferred from the roof space will be ineffective in heating the living space. Furthermore, unless the temperature in the roof space exceeds a predetermined threshold temperature, transferring air from the roof space will not create the desired heating effect. Indeed, if the air being transferred into the living space is at a temperature below the predetermined threshold temperature, the movement of air can have a cooling effect on the occupants, rather than a warming effect. Typically, the predetermined air temperature threshold is set between approximately 20° C. and 25° C., most preferably at approximately 22.75° C.

The above heating control strategy can be implemented in the electronic controller using the following control logic:

Heating On

| If | $T1 < (S/P-P2)$ (With P2 Differential) ... (1) |
| --- | --- |
| And | $T3 > (T1 + P1)$ (With P5 Differential) ... (2) |
| And | $T3 > (P3 + P4)$ (With P4 Differential) ... (3) |
| Then | R2 energises |

Heating Off

If the above is not true
Then        R2 de-energises

Where,

| T1 | = | Room Temperature |
| --- | --- | --- |
| T2 | = | Outside (Ambient) Air Temperature |
| T3 | = | Roof Space Temperature |
| S/P | = | Room Temperature Set Point - Adjustable Potentiometer |
| P1 | = | Temperature Differential (initially set to 2.5K) |
| P2 | = | Temperature Differential (initially set to 0.25K) |
| P3 | = | Threshold Temperature - Heating Mode (initially set to 22.75° C.) |
| P4 | = | Temperature Differential (initially set to 0.50K) |
| P5 | = | Temperature Differential (Heating Fan) (initially set to 0.50K) |
| P6 | = | Temperature Differential (Cooling Fan) (initially set to 0.50K) |
| R1 | = | Cooling Fan Start Relay |
| R2 | = | Heating Fan Start Relay |

Each of the parameters P1 to P6 is software adjustable within the controller 26. Each of the above logical conditions operates with its own additional temperature differential. Thus, for example, condition (2) operates with a P5 temperature differential. This means that if condition (2) is satisfied, which means that the electric fan for heating has been activated, the electric fan will not be de-activated until the roof space temperature (T3) drops below (T1+P1) by at least 0.5K (P5) assuming conditions (1) and (3) remain true. Without an appropriate temperature differential (P5) there is a danger that the controller would continue to activate the heating fan as the air temperature (T3) in the roof space cools therefore driving the air temperature in the living space (T1) downwards. This is shown graphically in FIG. 3 where it appears that at about 6.30 pm the cooler air from the roof space started to drive the air temperature in the living space downwards. In that case, P5 was set at 2.5K (P5=P1) which meant the controller would not shut off the heating fan unless T3 fell below T1 which is difficult to achieve and not desirable.

Figure 3:
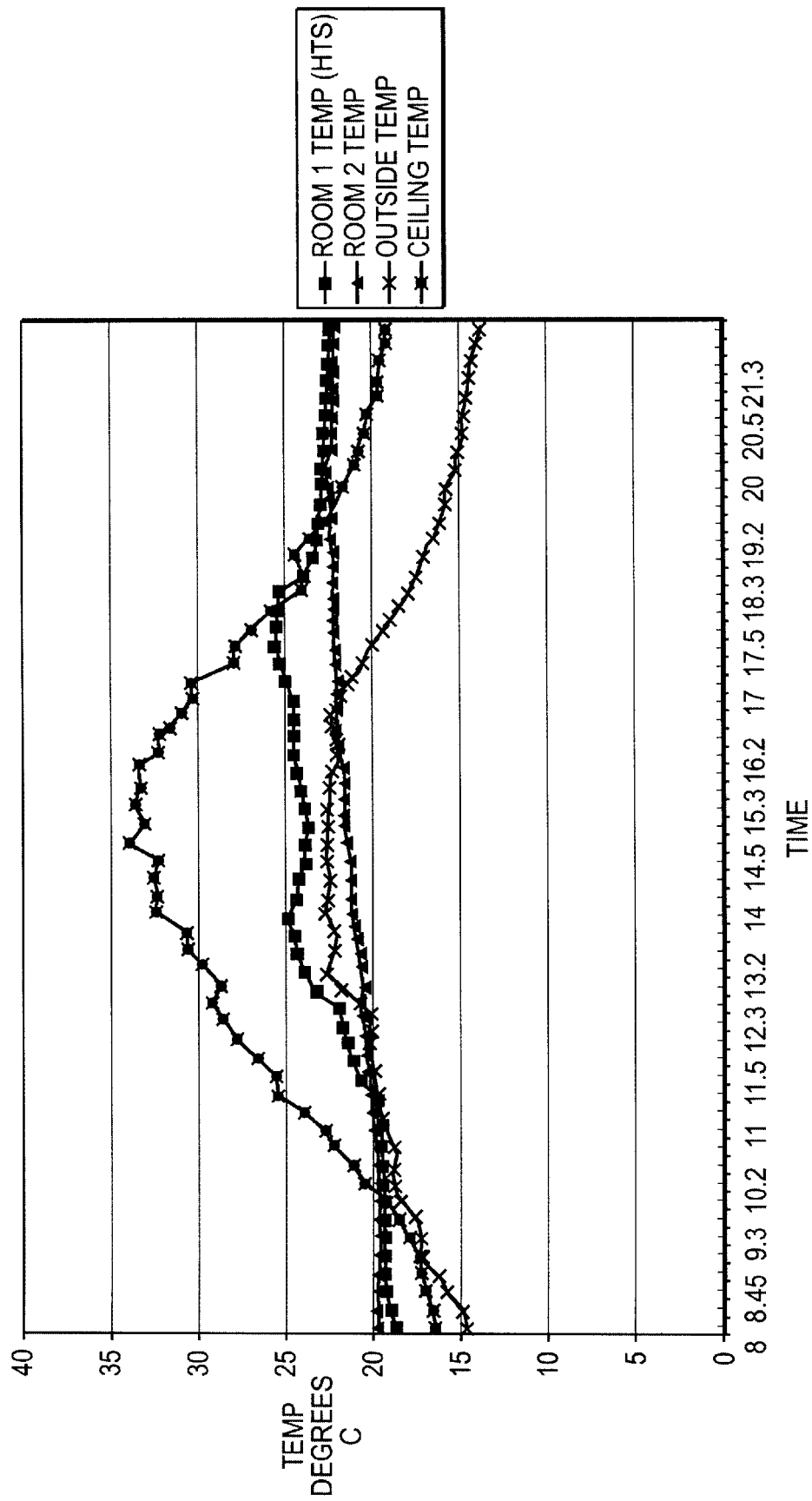
FIGS. 3 and 4 illustrate graphically operation of the DIY unit of FIG. 1 in heating and cooling modes respectively.

In FIG. 3, the operation of the heat transfer unit in a heating mode is illustrated graphically over a fourteen hour period from approximately 8.00 am to 10.00 pm. FIG. 3 graphs the air temperature in a room with the heat transfer unit installed (room 1), the air temperature in another room with no heat transfer unit installed (room 2) for comparison, the outside (ambient) temperature and the roof space temperature. At approximately 10.00 am the temperature in the roof space started to climb above the ambient temperature and the room temperature, climbing to a peak of approximately 34° C. at 3.00 pm. The room temperature set point (S/P) was set at 24° C. and the temperature limit lockout threshold temperature (P3) was set at 22.75° C. It will be seen that conditions (1), (2) and (3) were all satisfied at approximately 11.30 am at which point the controller activated the heating fan. Thereafter, the temperature in room 1 started to climb as warm air from the roof space was transferred into room 1 by the heat transfer unit. At about 2.00 pm the temperature in room 1 reached 24° C. (S/P) at which point the controller deactivated the heating fan. For the remainder of the day the heat transfer unit continued to cycle utilising the P2 differential to maintain the air temperature in the room around the preset room temperature of 24° C. (S/P) in accordance with the above control algorithm, until the roof space temperature fell below 22.75° C. (P3) at approximately 7.30 pm. Thereafter, the controller deactivated the heating fan.

The electric fans 20,30 may be variable speed fans capable of operating at two or more speeds. In that case, the controller 26 may be programmed to adjust the speed of the fans in accordance with changes in temperature. For example, in the heating mode, if the temperature in the roof space (T3) is higher than the room temperature (T1), but still below the threshold temperature (P3), the electric fan 20 may be switched ON at low speed. However, once the roof space temperature exceeds the threshold temperature (P3), the controller will be switched to a higher speed. The reverse sequence could occur as the temperature in the roof space starts to cool. The controller 26 may also include a time clock to automatically switch the unit on or off after a predetermined time interval or at preprogrammed times.

The heat transfer unit 10 can also be made to operate in a cooling mode as illustrated in FIG. 2. In this mode, the heat transfer unit also requires a third temperature sensor located outside the building for sensing a third air temperature (T2) corresponding to the ambient or outside air temperature. The third temperature sensor 28 is preferably located under the eaves of the roof away from the walls of the building which may have become heated due to sunlight. The heat transfer unit 10 also preferably further comprises a second electric fan 30 used in the cooling mode for transferring warm air from within the living space into the roof space above. For this purpose, the cooling fan 30 is preferably located at the lower end of the duct 14 adjacent the ceiling vent 16. In an alternative embodiment, a single reversible electric fan could be employed at any location in place of the first and second fans 20, 30 for use in both heating and cooling modes. However, the non-reversible fans employed are very low cost and easily replaceable by the home handyman. Furthermore, the use of two electric fans located at respective ends of the flexible duct 14 has been found to work well in practice, and has the further advantage of inhibiting a thermo-syphoning effect during the winter months, when hot air may be syphoned up through the ceiling vent 16 due to convection when the heat transfer unit is not in operation.

In the cooling mode, the electronic controller controls the operation of the cooling fan 30 according to the following control strategy:

Cooling On

| If | T1 > (S/P + P2) (With P2 Differential) . . . (4) |
|---|---|
| And | T2 < (T1 − P1) (With P6 Differential) . . . (5) |
| Then | R1 energises |

-continued

Cooling Off

| If the above is not true | |
|---|---|
| Then | R1 de-energises |

In the cooling mode, the heat transfer unit 10 is most effective at night when the ambient air temperature (T2) is likely to fall below the inside room temperature (T1). Under these conditions, provided that the room temperature exceeds the preset room temperature (S/P) by the second predetermined temperature differential, the cooling fan 30 is activated to transfer warm air from within the living space 18 into the roof space 12. For this purpose, a window 32 in the room below must be opened in order to allow cool ambient air to be drawn into the living space 18 to replace the warm air being transferred into the roof space 12. The warm air being transferred into the roof space is typically cooler than the air already in the roof space. Therefore this has the additional benefit of cooling the air in the roof space, which also helps to reduce the temperature in the living space below.

Figure 4:
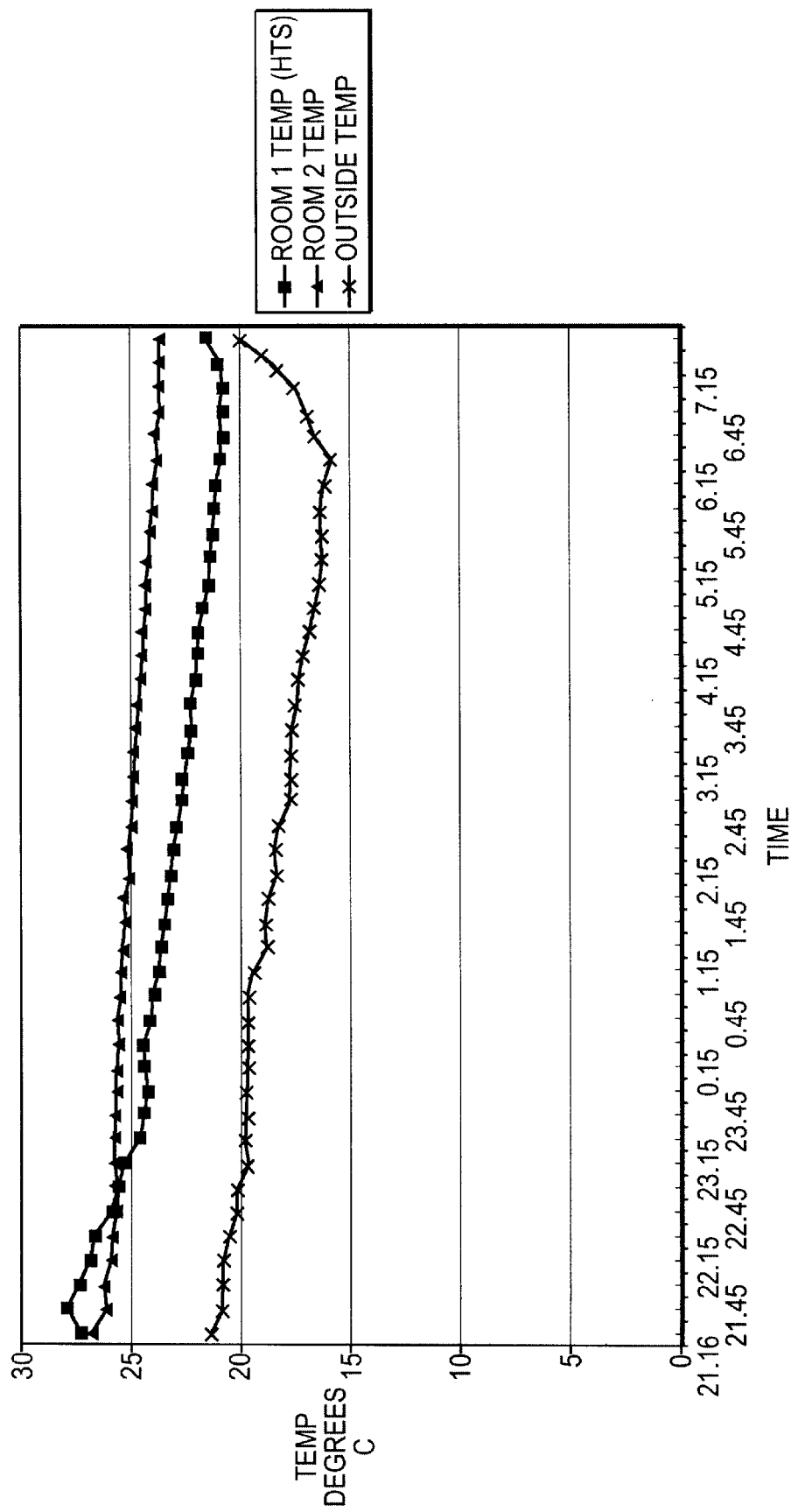

FIG. 4 illustrates graphically the operation of the heat transfer unit 10 in a cooling mode during a nine hour period from approximately 9.15 pm to 7.30 am. Once again, the temperature in another room without a heat transfer unit is shown for comparison. It can be seen that at 9.15 pm, the outside air temperature had already fallen to well below the inside room temperature, and therefore the heat transfer unit commenced operation immediately in the cooling mode. As can be seen in FIG. 4, the temperature in the room cooled with a heat transfer unit was lowered significantly below that of the room without heat transfer unit throughout the night from approximately 11.00 pm onwards.

As a DIY unit, the heat transfer unit 10 is designed to be sold as a kit and installed with the minimum amount of work and alterations. A hole will need to be cut through the ceiling in order to receive the ceiling vent 16 with the duct 14 attached thereto. Advantageously, the flexible duct 14 is of a concertina-type construction which enables the entire unit to be packaged within a carton of approximately 350 mm² by 350 mm high. The flexible duct 14 extends up to approximately 1.5 metres in length to accommodate varying ceiling to roof distances and to enable the warmer air near the top of the roof space to be transferred into the living space in the heating mode. The complete kit, which includes the duct, fans, controller and sensor cables is very compact when packaged and weighs approximately 5 kilograms for economical freight and ease of handling.

The unit is self-contained with all controls typically mounted on a rim of the ceiling vent 16. These controls typically include a switch for selecting heating or cooling mode and a control knob 34 for manually adjusting the preset room temperature (S/P). Alternatively, a remote control may be provided which communicates with the controller 26 via radio frequency (RF) or infrared (IR) transmission. Advantageously, the remote control may be wall-mounted and may incorporate the second temperature sensor 24 for sensing the temperature within the living space 18. A home handyman can easily carry out the entire installation in approximately 2 hours, except for the provision of a non-switched power outlet 36 above the ceiling adjacent the location of the heat transfer unit 10 for supplying power thereto.

Figure 5:
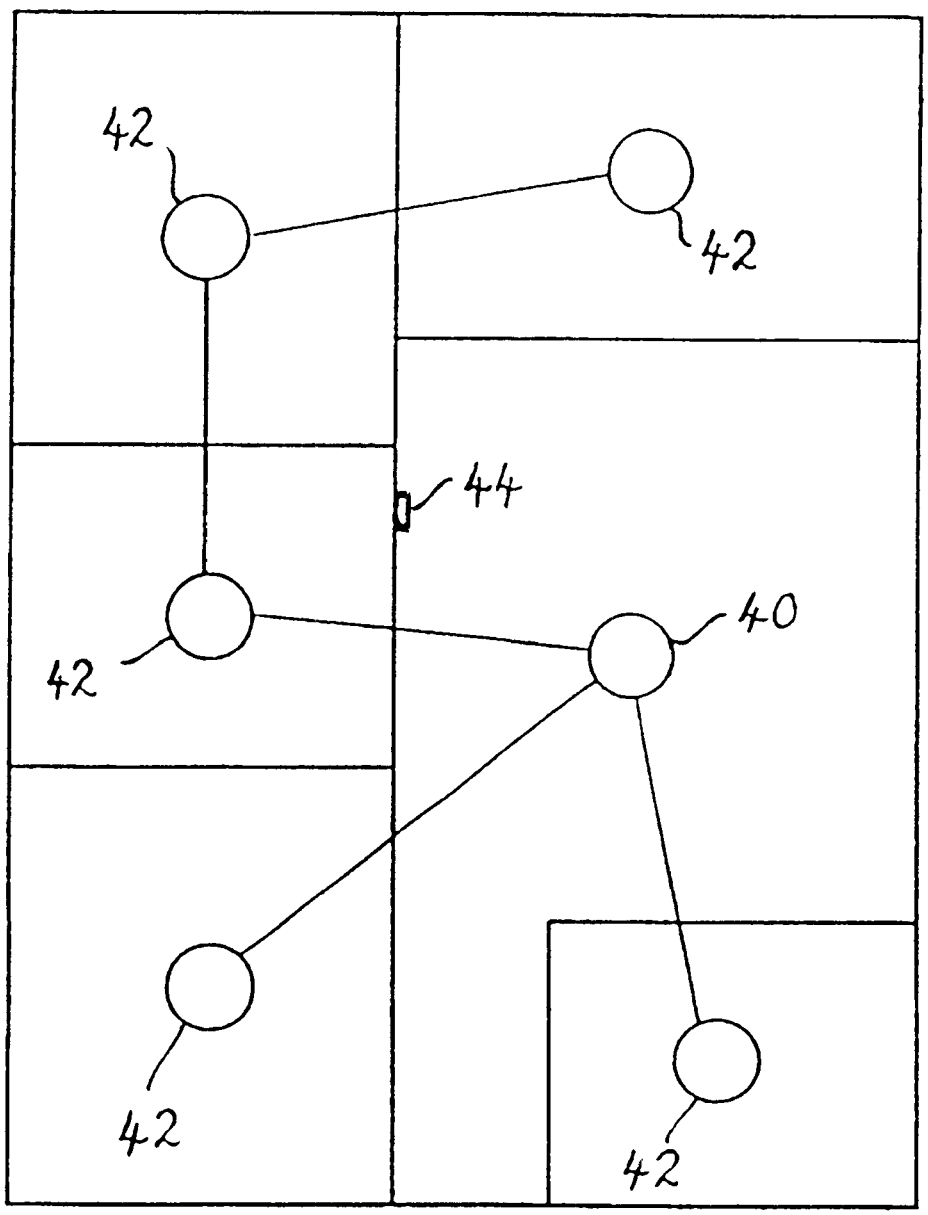
FIG. 5 is a schematic diagram of a heat transfer system that employs a plurality of DIY units similar to that of FIG. 1 in a MASTER/SLAVE configuration.

Each DIY heat transfer unit 10 is capable of heating or cooling an area of up to approximately 40 square metres. If desired, a plurality of such heat transfer units 10 may be installed in selected rooms throughout the building to provide uniform heating/cooling throughout the building. FIG. 5 illustrates a heat transfer system which employs a master heat transfer unit 40 with a plurality of slave heat transfer units 42 connected thereto. The master unit 40 is similar to the heat transfer unit 10 of FIGS. 1 and 2 in that it incorporates an electronic controller for controlling operation of the heat transfer system. However, each of the slave units 42 does not require an electronic controller, as it is controlled by the controller of the master unit 40. Optionally, each slave unit 42 may be provided with its own room temperature sensor for sensing the air temperature in the living space below each slave unit 42. In this way, the electronic controller in the master unit 40 is able to monitor the air temperature throughout the building and activate a particular slave unit 42 to provide selective heating/cooling in response to changes in the room temperature. However, more typically only the master unit 40 is provided with a room temperature sensor 44, which is used by the master unit 40 to control the operation of all of the slave units 42 simultaneously. Each of these slave units 42 may be hardwired to the master unit 40 as shown in FIG. 5. Alternatively, wireless communication links may be employed between the slave units 42 and master unit 40 using low-power RF transmission.

When using a single heat transfer unit 10 in the heating mode it is not usually necessary to provide any additional ventilation in the living space, as the cooler air being displaced by warmer air from the roof space escapes under doors and through other leakage gaps. However, when using multiple heat transfer outlets as shown in FIGS. 5, 6 and 7 it may be necessary to open one or more doors or windows to avoid pressurisation of the living space and allow efficient operation.

A larger version of the DIY heat transfer unit may be provided for heating or cooling larger areas. For example, the unit may incorporate a more powerful fan capable of transferring a greater volume of air from the roof space into the living space below. Such an enlarged DIY unit may be fitted into an existing manhole cover, of the kind that is often found in the hallway ceiling or other central location of a house for access to the roof space. In this way the need to cut a new hole in the ceiling can be avoided and the unit is more easily removed.

The heat transfer system in accordance with the present invention may be employed in conjunction with and/or incorporated within a conventional air conditioning system at the time of manufacture or installation. In this connection, the heat transfer system may be retrofitted to an existing air conditioner which has already been installed in a building. One of the advantages of such an arrangement is that the heat transfer system can make use of the existing ducting provided for the air conditioner.

Figure 6:
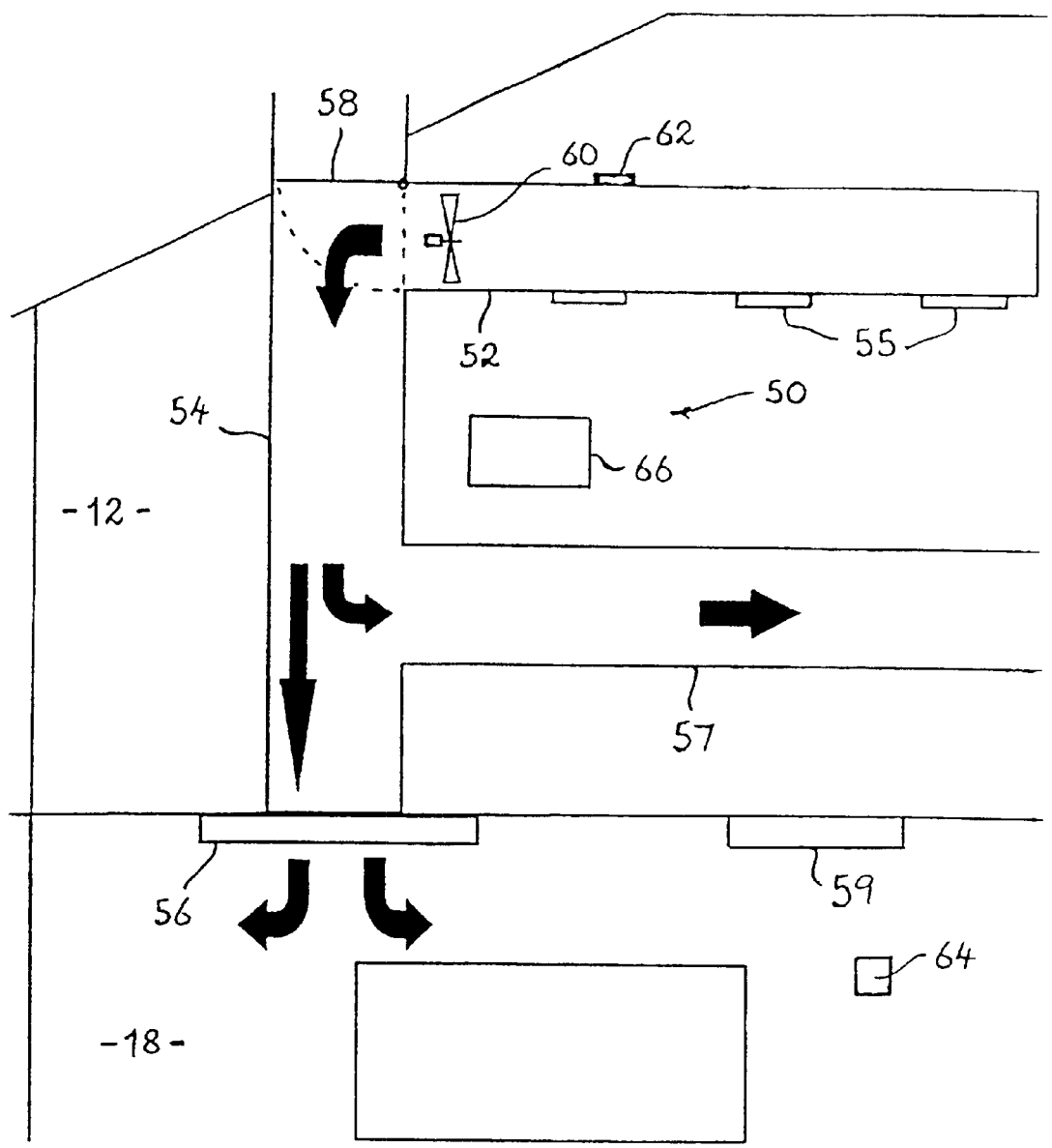
FIG. 6 is a schematic diagram of a second embodiment of the heat transfer system employed in conjunction with a conventional air conditioning system.
Figure 7:
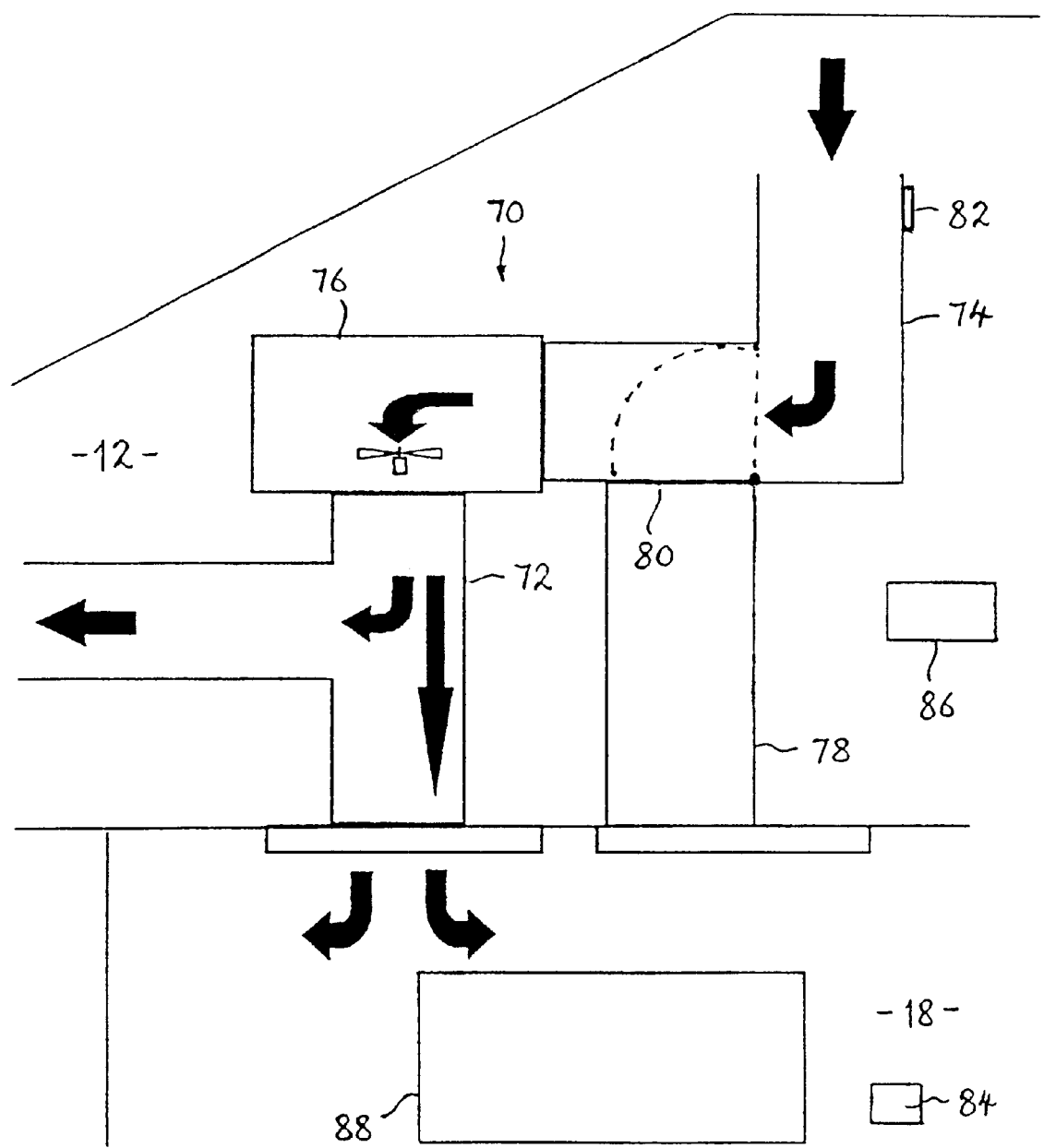
FIG. 7 is a schematic diagram of a third embodiment of the heat transfer system employed in conjunction with a conventional air conditioning system.

FIG. 6 illustrates a second embodiment of the heat transfer system 50 which utilises the ducting system for an external air conditioner (not shown). The external air conditioner may, for example, be an evaporative air conditioner of the kind which is mounted on the roof of a building. The heat transfer unit 50 includes a warm air duct 52 which is connected to an existing duct 54 of the air conditioner connected to a ceiling vent 56 and a plurality of other outlets via branching ducts 57. The warm air duct 52 is connected to the air conditioner duct 54 near an upper region of the roof space 12 where the warmer air tends to accumulate. Advantageously the warm air duct 52 extends for some distance through the upper region of the roof space 12 and is provided with a plurality of inlet ports 55 facing downwards at spaced intervals along its length. Warm air is drawn in via inlet ports 55 with minimum risk of dust entering the warm air duct 52. A moveable diverter or damper 58 can be moved between a first position (as shown) in which the duct 52 opens into the air conditioner duct 54 to allow the transfer of warm air from within the roof space 12 into the living space 18 below, and a second position (shown in broken outline) in which the duct 52 is closed and cool air from the air conditioner can be transferred via the air conditioner duct 54 into one or more living spaces 18 below. Damper 58 may be manually moveable, or may be automatically moveable when the heat transfer system is switched from a heating mode to a cooling mode or vice versa. Separate dampers may be provided in the air conditioner duct 54 and the warm air duct 52 if preferred.

An electric fan 60 is provided within the warm air duct 52 arranged to force air through the air conditioner duct 54 into the living space below. Although the electric fan 60 as shown in FIG. 6 is an axial fan, any suitable electric fan may be employed. A large drum fan may be required to transfer the volume of air from the roof space via the air conditioner ducting system throughout the building. A first temperature sensor 62 provided adjacent the inlet ports 55 of the duct 52 senses the air temperature within the roof space 12, and a second temperature sensor 64 senses the air temperature within the living space 18. Both the first and second sensors 62, 64 are connected to an electronic controller 66 which controls the operation of the electric fan 60 and possibly also the damper 58. Interconnecting wires have been omitted for clarity. Advantageously, the second temperature sensor 64 may be incorporated in a remote control of the air conditioning unit which is also designed to communicate with the electronic controller 66 via RF or IR transmission.

The electronic controller 66 may be fully integrated into the control system for the air conditioner, or may be separate as a stand-alone unit. In this embodiment, the heat transfer apparatus 50 does not operate in a cooling mode, as the air conditioner can be employed to provide cooling when required. In other respects, operation of the heat transfer apparatus 50 is similar to that of the heat transfer unit 10 described above.

In some applications, it may be possible to utilise the same electric fan for both the external air conditioner and the heat transfer apparatus. In such an arrangement, an electric fan is located in the duct 54 below the damper 58 so that it draws air down from the air conditioner in the cooling mode and down from the roof space via warm air duct 52 in the heating mode. The arrangement of FIG. 6 has the further advantage that the damper 58 prevents a downdraft of cold air from outside during cooler weather in the heating mode.

With conventional evaporative cooling systems it is generally essential to have at least one window or door open in cooling mode so that the warm air in the living space can be displaced by the cooled air entering via the air conditioner duct 54. However, it is also known to provide a security vent 59 in the ceiling of the building so that the evaporative cooler can be operated at night, or when the building is unoccupied, without compromising security. Security vent 59 is a one-way vent that only opens once the air within the living space 18 becomes pressurised, to allow the warmer air near the ceiling to be vented into the roof space. The security vent 59 can be used in a similar manner with the heat transfer system 50 operating in the heating mode. The security vent 59 needs to be positioned sufficiently distant from the warm air duct 52 to prevent short-circuiting. If all windows and doors are closed, warm air being transferred into the living space 18 will eventually pressurise the living space sufficiently to open the security vent 59. The air near the ceiling will then be vented into the roof space where it can be reheated before being recycled through the heat transfer system. This may improve the performance of the heat transfer system, particularly when the outside air temperature is cooler than the air temperature in the living space, as the air replaced in the roof space then requires less heating.

In FIG. 7 a third embodiment of the heat transfer system in accordance with the invention is illustrated this time utilising a ducting system and fan for an internal air conditioner. In the heat transfer apparatus 70 of this embodiment, air transfer means in the form of air conditioning ducting 72 is employed in conjunction with a warm air duct 74 for transferring warm air from within the roof space 12 to one or more living spaces 18 within the building. The illustrated embodiment employs a reverse cycle air conditioner, for example, of the split system kind which has a fan 76 located within the roof space and a return air duct 78 for drawing air back up from the living space 18 for cooling or heating as required. The warm air duct 74 is located adjacent the return air duct 78 and is provided with a damper or diverter 80 for closing off the return air duct 78 (as shown) in the heating mode of the heat transfer apparatus 70. In the heating mode, the heat transfer apparatus 70 employs the air conditioner fan 76 to force air through the ducting 72 into one or more living spaces 18 below.

A first temperature sensor 82 is provided adjacent the inlet of the warm air duct 74 for sensing the air temperature within the roof space 12 and a second temperature sensor 84 is provided within the room below for sensing the air temperature within the living space 18. Both temperature sensors 82, 84 are connected to an electronic controller 86 which controls the operation of the air conditioner fan 76 in the heating mode of the heat transfer apparatus 70. Controller 86 may be incorporated in the control system of the air conditioner if desired. Controller 86 is programmed to activate the air conditioner fan 76 only when the air temperature within the roof space 12 exceeds the air temperature within the living space 18 by a predetermined temperature differential so that warm air transferred from the roof space is able to heat the living space below. Operation of the heat transfer apparatus 70 is similar to that of the previous embodiments and will not be described in detail again.

If desired, the heat transfer system 70 of FIG. 7 may optionally be fitted with a second electric fan located in the warm air duct 74, to enable the system to operate in a cooling mode. This may provide a low cost alternative to switching on the air conditioner, especially at night time. The second electric fan is designed to draw warm air from within the living space 18 up through ducting 72 and into the roof space 12 through duct 74. Damper 80 is left in the same position as in the heating mode, and air conditioner fan 76 is left off. Cool air from outside is allowed to flow in through window 88 to replace the warm air drawn up into the roof space.

Figure 10:
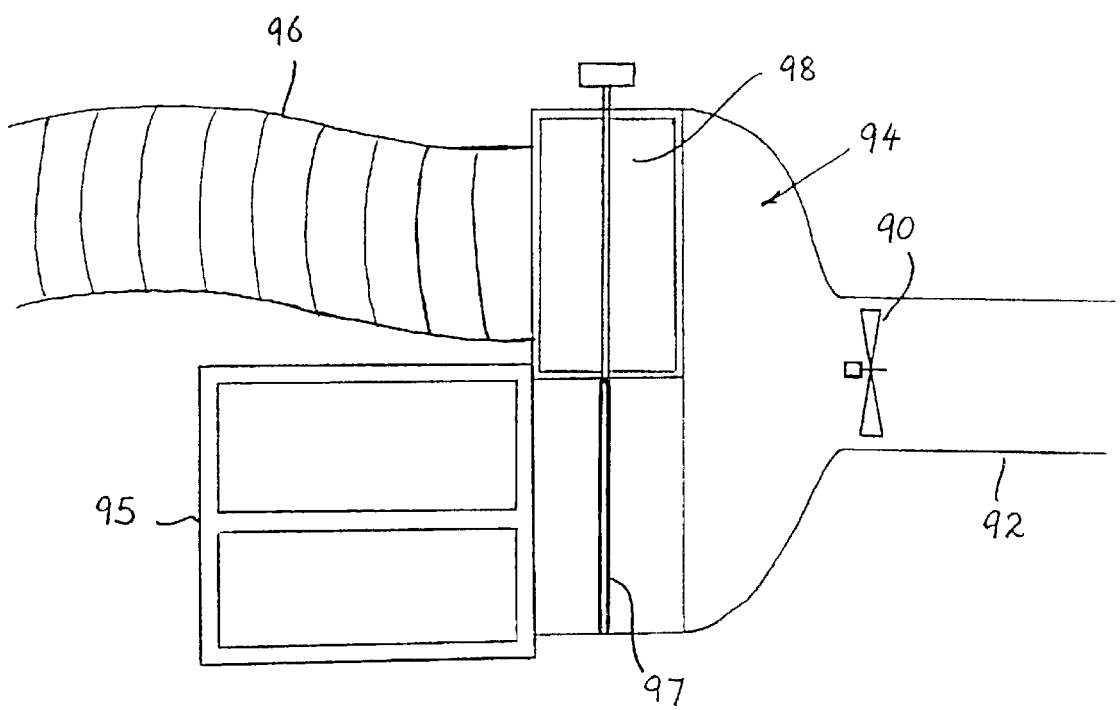

FIG. 10 illustrates a further modification which may be incorporated in the heat transfer system in accordance with the invention which allows simultaneous cooling of the roof space in the cooling mode. For example, the arrangement of FIG. 10 may be employed with the heat transfer system of FIG. 6. The arrangement of FIG. 10 includes an electric fan 90 for drawing warm air from the roof space into a warm air duct 92 (similar to fan 60 and duct 52 in FIG. 6). A differential damper 94 is provided for allowing the warm air for the roof space to be directed into either an air conditioner duct 95 or an eaves duct 96 as required. Differential damper 94 includes a first damper 97 for opening and closing access from the warm air duct 92 to the air conditioning duct 95, and a second damper 98 for opening and closing access from the warm air duct 92 to the eaves duct 96. The first and second dampers 97,98 are mounted on a common spindle but at 180° with respect to each other. Thus, when one of the dampers is opened the other will be closed, and vice versa. A suitable actuator, for example a small stepper motor may be provided for pivoting the differential damper 94 through 90° in a clockwise direction or an anti-clockwise direction as required.

In the heating mode differential damper 94 will be positioned so that the first damper 97 is open to allow warm air to be forced by the electric fan 90 into the air conditioning duct 95. However, in a cooling mode differential damper 94 will be repositioned so that the first damper 97 is closed and the second damper 98 is in the open position (as shown in FIG. 10). In this mode, the electric fan 90 can be operated to exhaust warm air from the roof space to the exterior of the building through the eaves duct 96. In this way, not only is the living space below being cooled by the air conditioning system via duct 95, but the roof space above is also being cooled by exhausting the accumulated warm air to atmosphere. Reducing the temperature of the roof space can dramatically improve the cooling of the living space as it minimises the reradiation of heat from the roof space through the ceiling into the living space.

Figure 8:
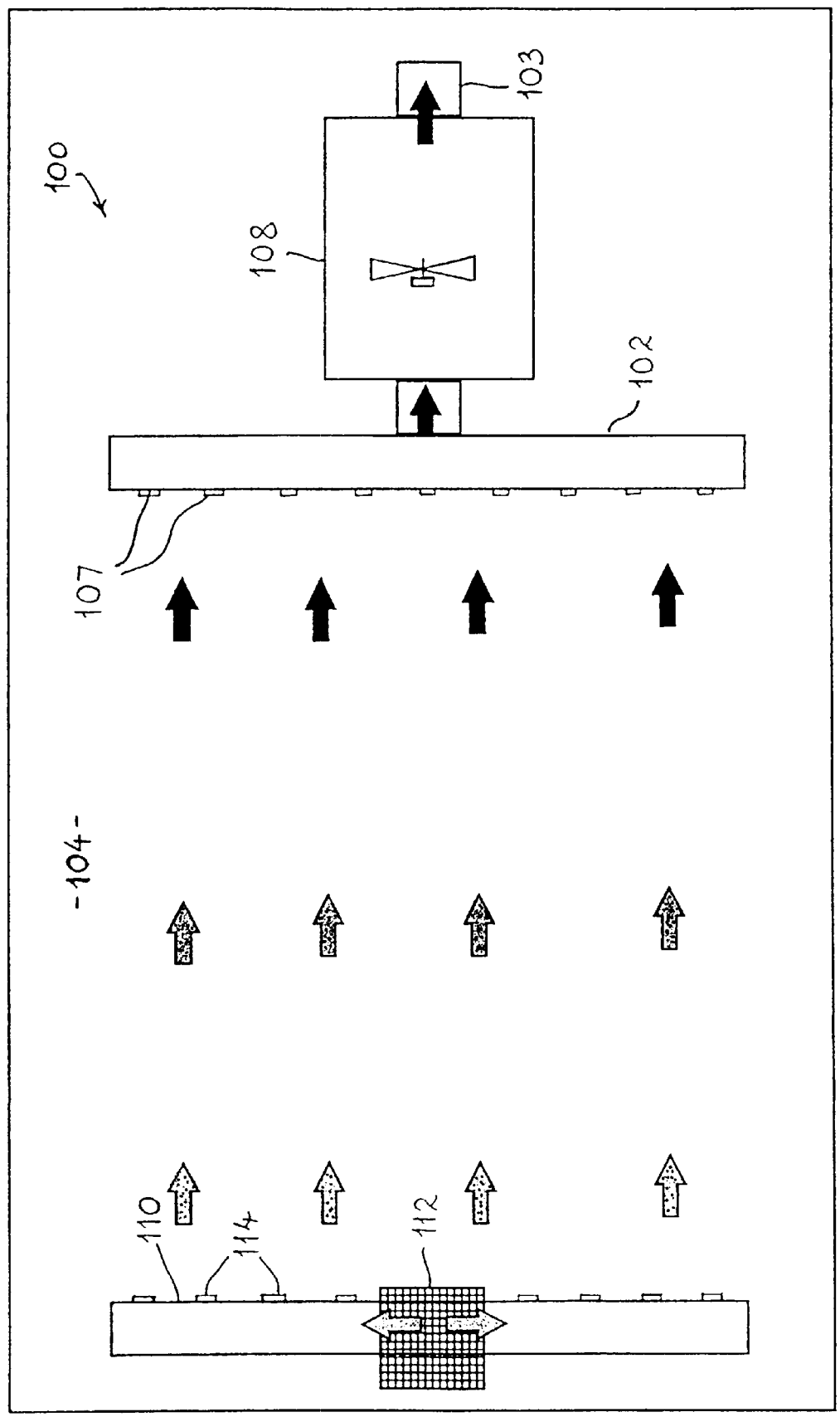
FIG. 8 is a schematic plan view of a fourth embodiment of the heat transfer system employed in a large building such as a shopping centre.
Figure 9:
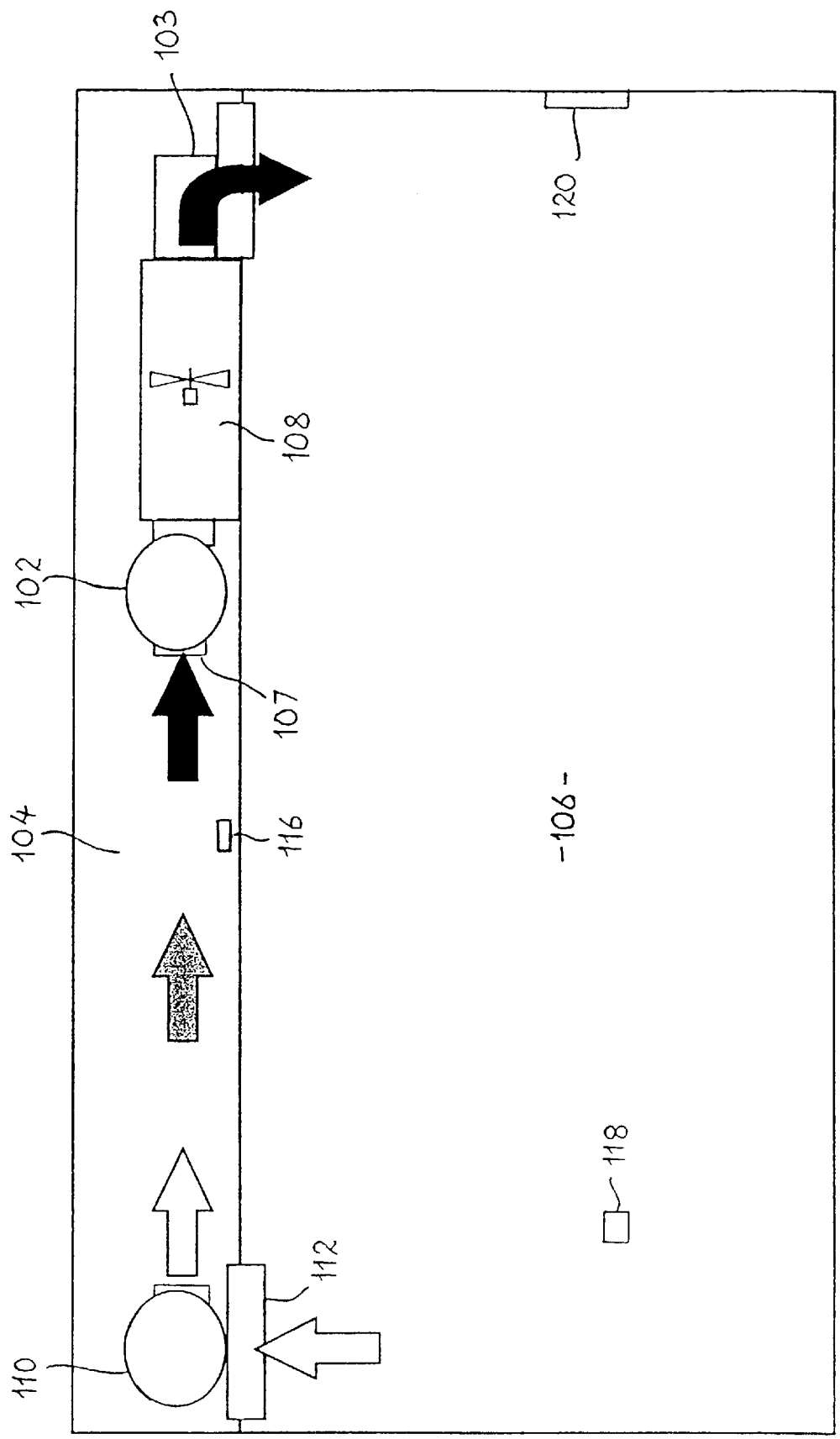
FIG. 9 is a schematic side elevation of the heat transfer system of FIG. 8; and, FIG. 10 is a plan view of a differential damper arrangement that can be used in connection with the heat transfer system.

The heat transfer system of the present invention is not limited to domestic applications, but may also be employed in large commercial environments such as shopping centres and industrial buildings. FIGS. 8 and 9 illustrate a fourth embodiment of the heat transfer system which has been installed in a large commercial building for operation in conjunction with a conventional air conditioning system. In the heat transfer apparatus 100 of this embodiment, air transfer means in the form of a warm air inlet manifold 102 is employed in conjunction with the existing ducting 103 for the air conditioning system for transferring warm air from within the roof space 104 into the living space 106 within the building. An air handler unit 108 of the conventional air conditioning system includes one or more large fans which are used to force air through the air conditioning ducting into the living space 106 below. The warm air inlet manifold 102 is provided with a plurality of inlet ports 107 provided at spaced intervals along its length for drawing warm air from the roof space 104 into the air handling unit 108. In this way, the warm air within the whole volume of the roof space can be employed for heating the living space below.

A return air manifold 110 is provided within the roof space 104 some distance from the inlet manifold 107, and preferably at the other end of the building. Return air is drawn up from the living space 106 below through a return air grille 112 which covers a return air duct that feeds into the return air manifold 110. A plurality of outlet ports 114 are provided at spaced intervals along the length of the return air manifold 110 for returning the air into the roof space 104. The return air gently wafts through the roof space 104 in which it is heated by solar radiation before being drawn into the warm air inlet manifold 102.

One or more first air temperature sensors 116 may be provided adjacent the warm air inlet manifold 102 for sensing the air temperature within the roof space 104. One or more second air temperature sensors 118 are provided within the room or rooms below for sensing the air temperature within the living space 106. Both temperature sensors 116,118 are connected to an electronic controller 120 which controls the operation of the air handling unit 108 in the heating mode of the heat transfer apparatus 100. Controller 120 may be incorporated in the control system of the air conditioning system if desired. Controller 120 is programmed to activate the transfer of warm air from the roof space through the air handler unit 108 only when the air temperature within the roof space 104 exceeds the air temperature within the living space 106 by a predetermined temperature differential so that warm air transferred from the roof space is able to heat the living space below. It will be understood that various damper arrangements will be required to redirect the flow of air from various sources through the air handling unit 108 and ducting in different operational modes of the air conditioning system. Operation of the heat transfer apparatus 100 is similar to that of the previous embodiments and will not be described in detail again.

Now that several embodiments of the heat transfer system have been described in detail, it will be apparent that it provides a number of advantages including the following:

(i) it can provide low-cost and environmentally friendly heating and/or cooling of a living space by utilising solar heated warm air within the roof space and/or cool air from outside;

(ii) the use of temperature sensors and a controller ensures that the air temperature within the living space can be maintained close to a preset room temperature whenever possible;

(iii) in the heating mode it ensures that warm air is only transferred from the roof space when the air temperature in the living space is less than a set point temperature by a predetermined amount, and when the temperature of the air in the roof space exceeds a threshold temperature and the temperature of the air in the living space by a predetermined amount;

(iv) in the cooling mode it ensures that cool air is only transferred from the outside when the air temperature in the living space exceeds the outside air temperature and the set point temperature by predetermined amounts;

(v) in the cooling mode, the transfer of relatively cooler air into the roof space also helps to reduce the temperature in the living space below;

(vi) it is low cost to manufacture and easy to install and operate;

(vii) it can be incorporated or retrofitted in conventional evaporative and refrigerated air conditioning systems;

(viii) in the Do It Yourself (DIY) it is ideal for the home handyman and is readily expanded to suit commercial environments; and, (ix) it provides a low cost method of utilising the thermal mass of the building, with the added option of raising the set point temperature above a comfort level so as to heat the interior of the building throughout the day, which provides reradiated heating during the night.

Numerous variations and modifications will suggest themselves to persons skilled in the air conditioning arts, in addition to those already described, without departing from the basic inventive concepts. For example, each of the temperature sensors may be fitted with a low power RF transmitter for transmitting a temperature sensing signal to the electronic controller thus obviating the need for installation of connecting cables. All such variations and modifications are to be considered within the scope of the present invention, the nature of which is to be determined from the foregoing description and the accompanying claims.

What is claimed is:

1. A heat transfer apparatus for heating a living space in a building, the apparatus comprising:

air transfer means arranged within a roof space of the building for transferring warm air from within the roof space into a living space below;

an electric fan arranged to force air through said air transfer means into the living space;

a first temperature sensor within the roof space for sensing a first air temperature within the roof space;

a second temperature sensor within the living space for sensing a second air temperature within the living space; and an electronic controller operatively connected to said electric fan and said first and second temperature sensors, and wherein said controller ensures that the electric fan is only activated when the first air temperature exceeds the second air temperature by a first predetermined temperature difference and when the first air temperature exceeds a predetermined threshold temperature, wherein said predetermined threshold temperature is selected to ensure that movement of the air from the roof space does not have a cooling effect on an occupant of the living space whereby, in use, warm air transferred from the roof space is able to heat the living space.

2. A heat transfer apparatus as defined in claim 1, wherein said controller also ensures that the electric fan is only activated when the second air temperature is below a preset room temperature.

3. A heat transfer apparatus as defined in claim 2, wherein the electric fan is only activated when the second air temperature is below said preset room temperature by a second predetermined temperature difference.

4. A heat transfer apparatus as defined in claim 3, wherein said preset room temperature is adjustable by an occupant of the living space.

5. A heat transfer apparatus as defined in claim 1, wherein the electric fan is only activated when the first air temperature exceeds the predetermined threshold temperature by a third predetermined temperature difference.

6. A heat transfer apparatus as defined in claim 5, wherein said predetermined threshold temperature is set at between 20° C. and 25° C.

7. A heat transfer apparatus as defined in claim 6, wherein the predetermined threshold temperature is set at approximately 22.75° C.

8. A method for controlling the transfer of heat from a roof space into a living space of a building using an electric fan to force warm air from the roof space of the building into the living space below, the method comprising:

sensing a first air temperature within the roof space;

sensing a second air temperature within the living space; and activating said electric fan only when the first air temperature exceeds the second air temperature by a first predetermined temperature difference and when the first air temperature exceeds a predetermined threshold temperature, wherein said predetermined threshold temperature is selected to ensure that movement of the air from the roof space does not have a cooling effect on an occupant of the living space whereby, in use, warm air transferred from the roof space is able to heat the living space.

9. A method for controlling transfer of heat as defined in claim 8, wherein the electric fan is only activated when the first air temperature exceeds the predetermined threshold temperature by a second predetermined temperature difference.

10. A method for controlling transfer of heat as defined in claim 9, wherein said predetermined threshold temperature is set at between 20° C. and 25° C.

11. A method for controlling transfer of heat as defined in claim 10, wherein the predetermined threshold temperature is set at approximately 22.75° C.

12. A method for controlling transfer of heat as defined in claim 8, wherein the electric fan is only activated when the second air temperature is below a preset room temperature.

13. A method for controlling transfer of heat as defined in claim 12, wherein the electric fan is only activated when the second air temperature is below said preset room temperature by a third predetermined temperature difference.

14. A method for controlling transfer of heat as defined in claim 13, wherein said preset room temperature is adjustable by an occupant of the living space.

* * * * *